United States Patent
Nanba

(10) Patent No.: US 7,540,278 B2
(45) Date of Patent: Jun. 2, 2009

(54) FLUID CONTROL VALVE

(75) Inventor: Kunio Nanba, Anjo (JP)

(73) Assignee: DENSO CORPORATION, Kariya (JP)

( * ) Notice: Subject to any disclaimer, the term of this patent is extended or adjusted under 35 U.S.C. 154(b) by 118 days.

(21) Appl. No.: 11/783,745

(22) Filed: Apr. 11, 2007

(65) Prior Publication Data
US 2007/0240690 A1 Oct. 18, 2007

(30) Foreign Application Priority Data
Apr. 12, 2006 (JP) ............................. 2006-109661

(51) Int. Cl.
*F02M 25/07* (2006.01)
*F02B 47/08* (2006.01)
*F16K 1/22* (2006.01)

(52) U.S. Cl. .................... 123/568.11; 123/568.24; 251/308

(58) Field of Classification Search .............. 123/336, 123/337, 188.3, 568.11, 568.12, 568.21, 123/568.23, 568.24; 251/304–308; 137/351; 138/145, 148, 149
See application file for complete search history.

(56) References Cited

U.S. PATENT DOCUMENTS

| 4,380,246 | A | * | 4/1983 | Casale et al. ................. 251/308 |
| 4,747,384 | A | * | 5/1988 | Hafner et al. ................ 123/470 |
| 6,311,677 | B1 | * | 11/2001 | Cook et al. ............ 123/568.12 |
| 7,124,750 | B2 | * | 10/2006 | Tsokonas ............... 123/568.21 |
| 7,234,444 | B2 | * | 6/2007 | Nanba et al. ................. 251/306 |

FOREIGN PATENT DOCUMENTS

EP 1 420 158 5/2004

* cited by examiner

*Primary Examiner*—Willis R Wolfe, Jr.
(74) *Attorney, Agent, or Firm*—Nixon & Vanderhye, PC

(57) ABSTRACT

A fluid control valve includes a housing defining therein a fluid passage. The fluid control valve further includes a valve member for controlling a fluid flow in the fluid passage by communicating and blocking by the fluid passage. The fluid control valve further includes a protection member being press-inserted into the housing for protecting the housing from heat of the fluid flow in the fluid passage. The housing is formed by die casting of an aluminum material. The protection member and a wall surface, which defines the fluid passage in the housing, define therebetween a thermal insulating layer for restricting thermal transmission of the fluid flow from the protection member toward the housing.

14 Claims, 6 Drawing Sheets

FLUID CONTROL VALVE

CROSS REFERENCE TO RELATED APPLICATIONS

This application is based on and incorporates herein by reference Japanese Patent Application No. 2006-109661 filed on Apr. 12, 2006.

FIELD OF THE INVENTION

The present invention relates to a fluid control valve having a member for restricting thermal transmission therein.

BACKGROUND OF THE INVENTION

According to EP 1 420 158 A2 (JP-A-2004-162665), an exhaust gas recirculation apparatus (EGR apparatus) is disclosed as an example of a fluid control valve. An internal combustion engine discharges exhaust gas from a combustion chamber thereof, and the EGR apparatus recirculates the exhaust gas as EGR gas partially into an air intake system of the engine. An exhaust gas recirculation valve (EGR valve) is provided midway through an exhaust gas recirculation pipe (EGR pipe) of the exhaust gas recirculation apparatus (EGR apparatus).

As shown in FIG. 6, the EGR valve 200 is constructed of a housing 101, a butterfly valve 102, a valve shaft 103, a coil spring 104, and a valve actuator device. The housing 101 is formed by die-casting of an aluminum material such as aluminum alloy. The butterfly valve 102 is movable in the housing 101. The valve shaft 103 is rotatable together with the butterfly valve 102. The coil spring 104 biases the butterfly valve 102 such that the butterfly valve 102 blocks a fluid passage in the housing 101. The valve actuator device actuates the butterfly valve 102.

The EGR valve 200 further includes a seal ring 105 provided to the outer circumferential periphery of the butterfly valve 102. The butterfly valve 102 is fixed to the tip end of the axis of the valve shaft 103 in a condition where the butterfly valve 102 is inclined with respect to the axis of the valve shaft 103 by a predetermined angle. The valve actuator device is constructed of an electric motor and a transmission device such as reduction gears. The electric motor generates driving force by being supplied with electricity. The transmission device transmits the driving force of the electric motor to the valve shaft 103. The housing 101 includes a cylindrical portion (gas passage portion) 107 and a valve bearing portion 108. The cylindrical portion 107 defines therein an exhaust gas recirculation passage (EGR passage) 106 being substantially circular in cross section. The valve bearing portion 108 rotatably supports the valve shaft 103.

A cylindrical nozzle 109 formed of a stainless steel is press-inserted into the fluid passage of the housing 101. The cylindrical nozzle 109 is arranged in a sliding portion in the vicinity of the full close position of the butterfly valve 102. The seal ring 105 has the seal ring sliding surface 66, which slides on the sliding portion of the cylindrical nozzle 109. The housing 101 has a cooling water passage 110 through which cooling water is circulated. In this structure, when exhaust gas, which is less than 400° C. in temperature, passes through the EGR passage 106, the housing 101 can be maintained lower than allowable temperature limit thereof.

In an engine of a vehicle such as an automobile, high-temperature exhaust gas, which is higher than 500° C. in temperature, may pass through the EGR passage 106. In this case, even cooling water is supplied through the cooling water passage 110, temperature of a housing 5 becomes greater than the allowable temperature limit due to thermal transmission from high-temperature exhaust gas.

When temperature of the housing 5 becomes greater than the allowable temperature limit, the gas passage portion 107 of the housing 101 may be deformed, consequently, circularity of the EGR passage 106 may decrease. In addition, as a cast defect such as a defect hole, a blowhole, a pinhole, and shrinkage becomes large, the surface of the housing 101 may swell As a result, the appearance of the housing 101 may be degraded, and consequently, quality such as rigidity and durability of the housing 101 may be also degraded.

When the engine discharges high-temperature exhaust gas higher than 500° C. in temperature, heat quantity transmitted from the housing 101 to components in the housing 101 increases. As a result, temperature of the components in the housing 101 also becomes higher than the allowable temperature limit thereof.

In particular, an oil seal 111 such as a seal rubber may be provided to the valve bearing portion 108 for restricting lubricant from leaking into the butterfly valve 102. In this structure, the oil seal 111 may be deteriorated due to heat transmitted from the high-temperature exhaust gas. Alternatively, the metallic bush 112 may be substituted to a sintered oil bearing, and the sintered oil bearing may be provided in the valve bearing portion 108. In this structure, oil may weep out of the sintered oil bearing due to heat transmitted from the high-temperature exhaust gas. Consequently, lubrication of the valve bearing portion 108 may be deteriorated.

The material of the housing may be changed from aluminum die cast to cast iron to enhance heat resistance of the housing 101. However, cast iron is less than aluminum die cast in dimensional accuracy. Accordingly, when the material of the housing 101 is changed from aluminum die cast to case iron, a cast-iron product of the housing 101 needs to be applied with machining works for accurately manufacturing the inner and outer peripheries thereof so as to obtain predetermined dimensional accuracy. As a result, manufacturing cost may drastically increase.

SUMMARY OF THE INVENTION

The present invention addresses the above disadvantage. According to one aspect of the present invention, a fluid control valve includes a housing defining therein a fluid passage. The fluid control valve further includes a valve member for controlling a fluid flow in the fluid passage by communicating and blocking by the fluid passage. The fluid control valve further includes a protection member being press-inserted into the housing for protecting the housing from heat of the fluid flow in the fluid passage. The housing is formed by die casting of an aluminum material. The protection member and a wall surface, which defines the fluid passage in the housing, define therebetween a thermal insulating layer for restricting thermal transmission of the fluid flow from the protection member toward the housing.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

Figure 1:
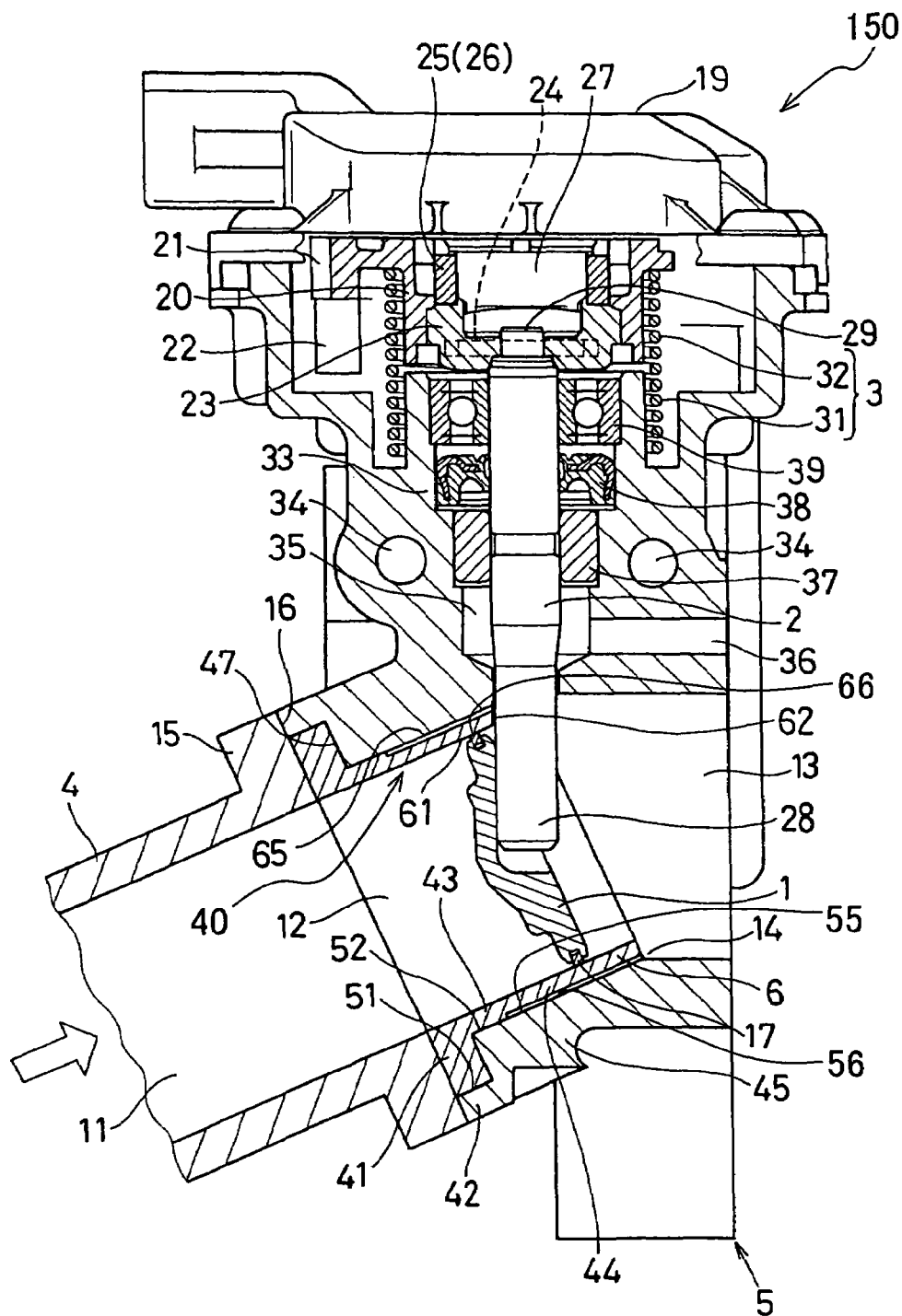
FIG. 1 is a sectional view showing an EGR valve of an Exhaust gas recirculation apparatus according to a first embodiment.

As shown in FIG. 1, an exhaust gas recirculation apparatus (EGR apparatus) is provided to an internal combustion engine 500 provided to a vehicle such as an automobile. The engine 500 has cylinders each defining a combustion chamber 500a, in which fuel or mixture gas is burned, so that the combustion chamber 500a discharges exhaust gas into an exhaust pipe 502. The EGR apparatus recirculates the discharged exhaust gas as EGR gas from the engine 500 partially into an intake pipe 501 of the engine 500. The engine 500 is, for example, a direct-injection diesel engine, in which fuel is injected directly into combustion chambers 500a. The engine 500 includes the intake pipe 501, the exhaust pipe 502, and an unillustrated purification device. Intake air is supplied into each combustion chamber 500a of each cylinder of the engine 500 through the intake pipe 501. Exhaust gas is discharged from the combustion chamber 500a to the outside through the exhaust pipe 502 and the purification device.

The EGR apparatus includes two exhaust gas recirculation pipes including an upstream EGR pipe 4 and a downstream EGR pipe 10 serving as fluid pipes, each defining a fluid passage therein, and an exhaust gas recirculation valve (EGR valve) 150.

EGR gas is drawn from the intake pipe 501 into the exhaust pipe 502 through the upstream EGR pipe 4. The EGR valve 150 is arranged between the upstream EGR pipe 4 and the downstream EGR pipe 10. In this embodiment, the upstream end of the upstream EGR pipe 4 with respect to EGR flow is airtightly connected with the exhaust pipe 502 such as an exhaust manifold. The downstream end of a downstream EGR pipe 10 with respect to EGR flow is airtightly connected with the intake pipe 501 such as an intake manifold.

Figure 5:
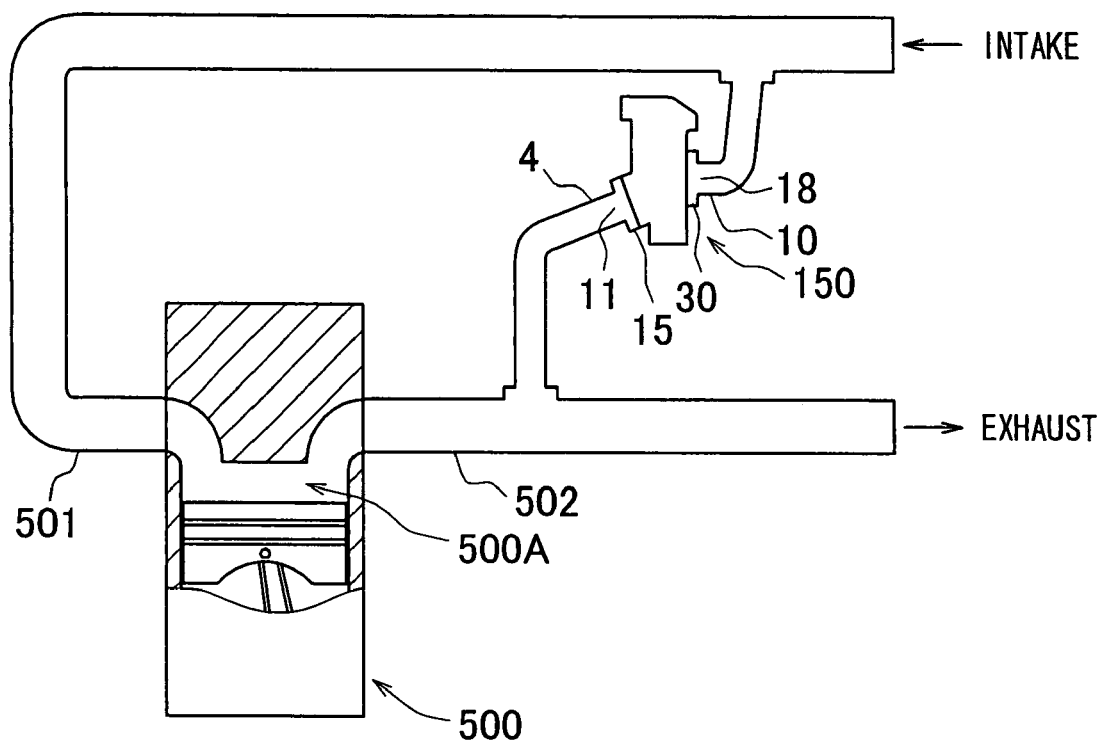
FIG. 5 is a schematic view showing the EGR valve and a internal combustion engine.
Figure 6:
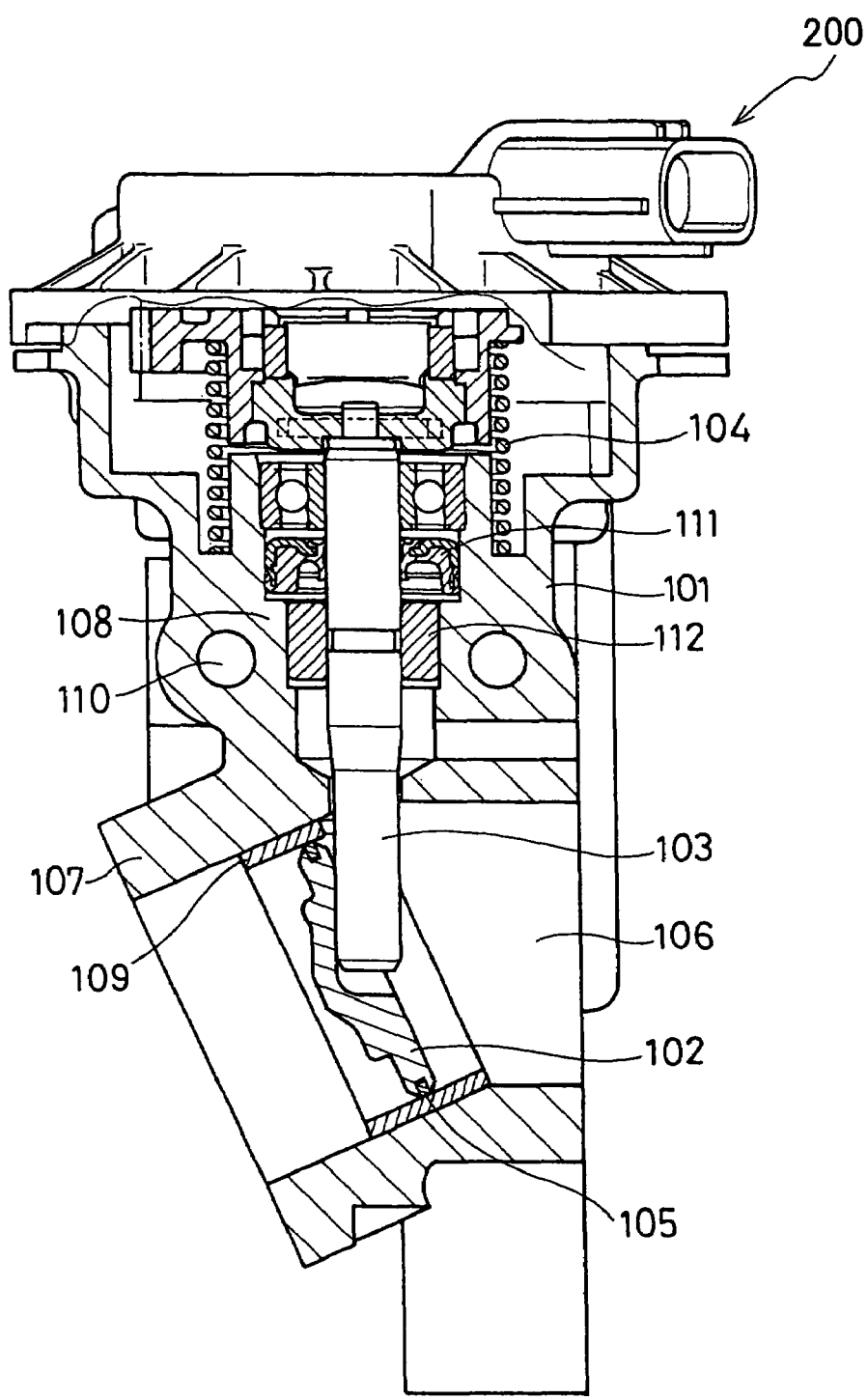
FIG. 6 is a sectional view showing the EGR valve according to a prior art.

As shown in FIGS. 1, 5, the upstream EGR pipe 4 defines therein an exhaust gas recirculation passage (EGR passage) 11 serving as a fluid passage. The downstream EGR pipe 10 defines therein an EGR passage 18 serving as a fluid passage. The EGR valve 150 defines therein a midstream EGR passage 12 and a downstream EGR passage 13 serving as fluid passages communicating the upstream EGR passage 11 with the EGR passage 18 in the downstream EGR pipe 10. The EGR passages 12, 13 are adapted to communicating with the upstream EGR passage 11. The EGR passages 12, 13 define a bend portion 14, in which EGR gas flow changes in direction, therebetween. The bend portion 14 may not be provided. In this case, the EGR passages 12, 13 may be connected substantially in straight.

The upstream EGR pipe 4 has a downstream axial end defining an opening. The downstream axial end of the upstream EGR pipe 4 has a first flange portion 15 in substantially annular shape. The first flange portion 15 defines a connecting end surface 16 that is opposed to a connecting end surface of the EGR valve 150. The connecting end surface 16 is connected airtightly with the connecting end surface of the EGR valve 150. The connecting end surface 16 serves as a first connecting end surface of the fluid pipe. The downstream EGR pipe 10 has an upstream axial end defining an opening. The upstream axial end of the EGR pipe has a second flange portion 30 (FIG. 5) in substantially annular shape. The second flange portion 30 defines an unillustrated connecting end surface that is opposed to the connecting end surface of the EGR valve 150. The connecting end surface of the second flange portion 30 is connected airtightly with the connecting end surface of the EGR valve 150.

In this embodiment, the EGR valve 150 serves as a fluid control valve. The EGR valve 150 is constructed of a butterfly valve 1, a valve shaft 2, a coil spring 3, a housing 5, and a housing protection member 6. The butterfly valve 1 is provided for variably controlling an amount (EGR amount) of EGR gas recirculated into the intake pipe 501. The butterfly valve 1 serves as a valve member of the EGR valve 150. The valve shaft 2 is rotatable integrally with the butterfly valve 1. The coil spring 3 is provided for biasing the butterfly valve 1 so as to block the EGR passage or communicate the EGR passage. The coil spring 3 serves as a biasing member. The housing 5 is connected airtightly with the upstream EGR pipe 4. The housing protection member (cylindrical member) 6 is in a substantially cylindrical shape to serve as a nozzle 6. The nozzle 6 is engaged with, i.e., fitter to the housing 5. The butterfly valve 1 has the outer circumferential periphery to which a seal ring 17 is provided. The seal ring 17 is in a substantially C-shape, and is capable of making contact airtightly with the inner periphery of the nozzle 6. The housing 5 has an outer periphery to which a sensor cover 19 is provided for holding an EGR flow sensor.

The valve actuator device is constructed of an unillustrated electric motor, a transmission device, and the like for actuating the butterfly valve 1 of the EGR valve 150 so as to communicating the EGR passage and blocking the EGR passage. The electric motor is supplied with electricity to generate driving force so as to rotate a motor shaft thereof. The transmission device transmits the rotation of the motor shaft to the valve shaft 2. In this embodiment, the transmission device is constructed of, for example, reduction gears.

The electric motor may be a DC motor such as a brushless motor or a motor with brush. The electric motor may be an AC motor such as a three-phase-current motor.

The reduction gears reduce rotation speed of the motor shaft at a predetermined reduction ratio. The reduction gears construct the transmission device for transmitting output torque, i.e. driving force of the electric motor to the valve shaft 2. The reduction gears include an unillustrated pinion gear (motor gear), an unillustrated intermediate reduction gear, and a valve gear 20. The motor gear is fixed to the outer circumferential periphery of the motor shaft. The intermediate reduction gear engages with the motor gear, so that the intermediate reduction gear rotates. The valve gear 20 engages with the intermediate reduction gear, so that the valve gear 20 rotates.

The valve gear 20 is formed of resin to be in a substantially annular shape, for example. The valve gear 20 has the outer circumferential periphery provided with gear teeth 21 for engaging with the intermediate reduction gear. The valve gear 20 is formed integrally with an opener protrusion 22. The valve gear 20 has a radially inner portion formed integrally with a rotor 23 made of nonmetallic material such as resin. The rotor 23 includes therein a valve gear plate 24. The valve gear plate 24 is formed of a metallic material and is insert-molded in the rotor 23.

In this embodiment, the EGR valve 150 serves as a fluid control valve for variably controlling the EGR amount of EGR gas mixed with intake air. That is, the EGR valve 150 is provided for controlling the EGR ratio relative to the amount of intake air. The EGR gas is part of exhaust gas discharged from the combustion chamber 500a of each cylinder of the engine 500. The EGR valve 150 is provided with a rotation-angle detection device. The rotation-angle detection device detects an angular position of the butterfly valve 1 in a non-contact manner, and produces a detection signal corresponding to the angular position, thereby electrically transmitting the detection signal to an engine control unit (ECU). Thus, the rotation-angle detection device outputs the signal indicating a valve position of the butterfly valve 1 to the ECU.

Specifically, the rotation-angle detection device is constructed of the rotor 23, a permanent magnet 25, a yoke 26, an EGR flow sensor 27, and the like. The rotor 23 is fixed to the end of the valve shaft 2 on the opposite of the butterfly valve 1. The permanent magnet 25 is supported by the rotor 23 to serve as a magnetic field source. The yoke 26 is constructed of pieces, and is magnetized by the permanent magnet 25. The EGR flow sensor 27 defines a magnetic circuit together with the permanent magnet 25 and the yoke 26 so as to serve as a valve position detecting unit (valve position sensor). The permanent magnet 25 and the rotor 23 are fixed to the inner circumferential periphery of the rotor 23 using glue or the like.

The EGR flow sensor 27 is fixed to a sensor support portion provided in the sensor cover 19. The EGR flow sensor 27 is constructed of a hall IC and the like opposed to the inner circumferential peripheries of the permanent magnet 25 and the yoke 26. The EGR flow sensor 27 detects the EGR amount, which indicates the amount of EGR gas mixed to the intake air flowing through the intake pipe 501, thereby outputting the detection signal to the ECU. The hall IC is an integrated circuit constructed of a hall element and an amplification circuitry. The hall element is a noncontact magnetic detection element. The hall IC outputs a voltage signal corresponding to magnetic flux interlinked with the hall IC. A hall element or a magnetoresistive element may be provided as the noncontact magnetic detection element, instead of the hall IC.

The valve actuator, in particular the electric motor is controlled in electricity supply using the ECU. The ECU includes a microcomputer including a CPU, a storage unit, an input circuit, an output circuit, and the like. The CPU executes control processings and arithmetic processings. The storage unit is a memory such as a ROM and a RAM that stores programs and data.

Various sensors such as the EGR flow sensor 27, a crank angle sensor, an accelerator position sensor, an airflow meter, and a cooling water temperature sensor output detection signals. Each of the detection signals of the various sensors is subjected to A/D conversion using an A/D converter, so that each of the A/D-converted signals is input to the microcomputer provided in the ECU.

The ECU subjects a feedback control to electricity supplied to the electric motor when an unillustrated ignition switch is turned ON (IG. ON). Specifically, the ECU executes a control program stored in the memory of the microcomputer so as to control the electricity supplied to the electric motor such that the valve position detected using the EGR flow sensor 27 substantially coincides with a set point, which is predetermined on the basis of an operating condition of the engine 500. When the ignition switch is turned OFF (IG. OFF), the execution of the control program of the ECU is forcedly terminated. When electricity supplied to the electric motor is terminated, the butterfly valve 1 is in a specific valve position by being applied with resiliency of the coil spring 3. In this embodiment, the ECU detects the specific valve position, when the electricity supply is terminated, and stores the specific valve position as a full close point ($\theta=0°$) of the control in the memory thereof. The full close point of the control corresponds to the full close position, in which the butterfly valve 1 fully blocks the EGR passage.

In this embodiment, the butterfly valve 1 is welded and fixed to the tip end of the axis of the valve shaft 2 in a condition where the butterfly valve 1 is inclined with respect to the axis of the valve shaft 2 by a predetermined angle, so that the butterfly valve 1 constructs an inclined plate in this structure. The valve shaft 2 is applied with driving force of the electric motor via the transmission device, so that the valve shaft 2 rotates. The butterfly valve 1 is formed of a heat-resistive material such as stainless steel, e.g., SUS 304 or heat-resistive steel to be in a substantially disc-shape to construct a butterfly-shaped rotor valve. The butterfly valve 1 controls the EGR amount of EGR gas mixed to intake air flowing through the intake pipe 501. The butterfly valve 1 rotates in a range between a full close position and a full open position in accordance with a control signal transmitted from the ECU during the engine 500 operates. Thus, the butterfly valve 1 changes the communication area (exhaust gas passage area) defined in the EGR passages 12, 13 of the EGR valve 150, thereby variably controlling the EGR amount.

When the butterfly valve 1 is in the full close position, the outer circumferential periphery of the butterfly valve 1 and the inner circumferential periphery of the nozzle 6 define the minimum gap therebetween, so that the EGR amount (EGR gas leakage amount) leaking through the gap becomes minimum. Thus, in this full close position, the amount of EGR gas flowing through the EGR passages 12, 13 becomes minimum. In this embodiment, the coil spring 3 includes a return spring 31 and a default spring 32.

The butterfly valve 1 defines the full close position with respect to the nozzle 6 or the housing 5 when the gap between the butterfly valve 1 and the nozzle 6 or the housing 5 becomes minimum.

The spring force of the return spring 31 and the spring force of the default spring 32 are balanced in a neutral position that corresponds to the full close position (full close point of the control) of the butterfly valve 1.

When the butterfly valve 1 is in a full open position ($\theta=70°$-$90°$), the EGR amount in the EGR passages 12, 13 becomes maximum.

The outer circumferential periphery of the butterfly valve 1 is provided with an annular sealing groove (annular groove). The sealing groove circumferentially extends entirely throughout the outer circumferential periphery of the butterfly valve 1. The seal ring 17, which is in the substantially C-shape, is fitted into the sealing groove. Specifically, the seal ring 17 is fitted into the sealing groove such that the radially inner end of the seal ring 17 is movable radially, axially, and circumferentially with respect to the sealing groove, in a condition where the radially outer end of the seal ring 17 protrudes from the outer circumferential periphery of the butterfly valve 1.

Thus, in this embodiment, when the butterfly valve 1 is maintained in the full close position, the seal ring 17 airtightly seals the gap between the outer circumferential periphery of the butterfly valve 1 and the inner circumferential periphery of the nozzle 6 in the EGR valve 150 by utilizing radial tension of the seal ring 17. That is, when the butterfly valve 1 is in the full close position, and is substantially perpendicular to the direction of average EGR gas flow in the EGR passages 12, 13, the seal ring 17 airtightly seals the gap in the nozzle 6 by utilizing the radial tension, which act the seal ring 17 to radially outwardly expand to the inner circumferential periphery of the nozzle 6.

The valve shaft 2 is formed of a heat-resistive material such as stainless steel, e.g., SUS 304 or heat-resistive steel. The valve shaft 2 is rotatable slidably with respect to the housing 5. The valve shaft 2 is a substantially column-shaped metallic member substantially circular in cross section. The valve shaft 2 axially extends straightly from one end to the other end. The one axial end of the valve shaft 2 protrudes into the EGR passages 12, 13 through the housing 5 and the nozzle 6, so that the one axial end is exposed to the interior of the EGR passages 12, 13. The one axial end of the valve shaft 2 is provided with a valve connecting portion 28, which is secured to the butterfly valve 1 by welding, for example. The other axial end of the valve shaft 2 is integrally formed with a crimped portion 29 to which the valve gear plate 24, which is insert-formed in the valve gear 20, is crimped and fixed.

The coil spring 3 is arranged between an annular recess of the housing 5 and an annular recess of the valve gear 20. The coil spring 3 is constructed by integrating the return spring 31 with the default spring 32. The return spring 31 has one end, wound in a return direction, on the side of the butterfly valve 1. The default spring 32 has the other end, wound in a default direction, on the side of the sensor cover 19. The return direction is different from the default direction. The other end of the return spring 31 is connected with the one end of the default spring 32 via connecting portion to which an unillustrated U-shaped hook is provided. The U-shaped hook is supported by a full close stopper integrated with the outer wall of the housing 5.

The return spring 31 serves as a first spring to bias the butterfly valve 1 in a close direction from the full open position to the full close position of the butterfly valve 1. The one end of the return spring 31 is supported by a spring hook provided to the annular recess of the housing 5.

The default spring 32 serves as a second spring to bias the butterfly valve 1 in an open direction from a position, over the full close position, to the full close position of the butterfly valve 1. The other end of the default spring 32 is supported by a spring hook provided to the opener protrusion 22 of the valve gear 20.

In this embodiment, the housing 5 is an aluminum die-cast product such as ADC12, AC5A, AC8A, AC8B, which are defined by Japanese Industrial Standard (JIS), formed of an aluminum alloy such as Al—Cu—Si alloy to be in a specific shape. The housing 5 defines therein the EGR passages 12, 13 to rotatably support the butterfly valve 1 from the full close position to the full open position. The housing 5 is fixed to the upstream EGR pipe 4, the exhaust pipe 502, or the downstream EGR pipe 10, or the intake pipe 501 by screwing a fastener such as a bolt.

The housing 5 has a valve bearing portion 33 and a cooling water passage 34. The valve bearing portion 33 rotatably supports the valve shaft 2. Engine cooling water is circulated through the cooling water passage 34. The cooling water passage 34 is arranged annually around at least the valve bearing portion 33. The valve bearing portion 33 of the housing 5 defines therein a shaft hole 35, which is substantially circular in cross section. The valve bearing portion 33 has a communication passage 36 on the side of the nozzle 6. Foreign matters such as unburned fuel and particles e.g., carbon contained in exhaust gas may intrude into the shaft hole 35. Even in this condition, the foreign matters can be removed from the shaft hole 35 into the EGR passage 18 in the downstream EGR pipe 10 through the communication passage 36 utilizing, for example, negative pressure in the intake pipe 501.

As referred to FIGS. 1, 5, the communication passage 36 communicates airtightly with the EGR passage 18 through the connecting end surface of the EGR valve 150 opposed to the connecting end surface of the second flange portion 30 of the downstream EGR pipe 10.

The valve shaft 2 has an intermediate portion between the valve connecting portion 28 and the crimped portion 29. An in-housing component such as a bushing 37, an oil seal 38, and a ball bearing 39 is provided between the outer circumferential periphery of the intermediate portion of the valve shaft 2 and the inner circumferential periphery of the valve bearing portion 33 of the housing 5 by, for example, press-insertion.

The bushing 37 is formed by sintering a metallic material such as copper and iron to be in a substantially cylindrical shape. The bushing 37 may be a sintered oil bearing (bearing member) in a substantially cylindrical shape. The bushing 37 is press-inserted into the inner circumferential periphery of the valve bearing portion 33 of the housing 5. The bushing 37 defines therein a slide hole for rotatably supporting the outer circumferential periphery of the valve shaft 2. The outer circumferential periphery of the valve shaft 2 and the inner circumferential periphery of the wall surface of the slide hole of the bushing 37 therebetween defines a substantially cylindrical gap (clearance), via which the valve shaft 2 is smoothly rotatable in the bushing 37.

The oil seal 38 is, for example, a rubber seal in a substantially annular shape.

The ball bearing 39 is, for example, a substantially cylindrical ball bearing including an outer wheel and an inner wheel. The inner circumferential periphery of the outer wheel has an annular groove. The outer circumferential periphery of the inner wheel has an annular groove. The annular grooves therebetween define a track, which rotatably supports balls as bearing members.

The oil seal 38 and the ball bearing 39 are press-inserted into a substantially annular gap between the outer circumferential periphery of the valve shaft 2 and the inner circumferential periphery of the valve bearing portion 33 of the housing 5.

The housing 5 has an upstream axial end defining an opening. The upstream axial end of the housing 5 has a flange fitting portion 42, in substantially annular shape, fitted to a flange portion 41 of the nozzle 6. The housing 5 has a nozzle fitting portion 45, in substantially annular shape, fitted to a cylindrical portion including a fitting protrusion 43 and a fitting recess 44 of the nozzle 6.

The flange fitting portion 42 of the housing 5 is less than the nozzle fitting portion 45 in thickness. The housing 5 has a connecting end surface 47 opposed to the connecting end surface 16 of the first flange portion 15 of the upstream EGR pipe 4. The flange fitting portion 42 of the housing 5 is arranged axially upstream of the connecting end surface 47. The connecting end surface 47 serves as a second connecting end surface of the housing 5. The flange fitting portion 42 has therein a flange-fitting hole, which is substantially circular in cross section. The nozzle fitting portion 45 of the housing 5 defines therein a nozzle-fitting hole, which is substantially circular in cross section.

The flange fitting portion 42 of the housing 5 has therein an inner circumferential periphery defining a first press-fitted portion 51 in which the nozzle 6 is press-inserted. The first press-fitted portion 51 serves as a press-fitted portion of the housing 5. The nozzle fitting portion 45 of the housing 5 has the wall surface, which has the inner circumferential periphery defining the fluid passage. The inner circumferential periphery of the nozzle fitting portion 45 has a second press-fitted portion 52 and a non-press-fitted portion 55. The nozzle 6 is press-inserted into the second press-fitted portion 52. The non-press-fitted portion 55 of the nozzle fitting portion 45 and the nozzle 6 defines a cylindrical space (cylindrical gap) 56 therebetween. The first press-fitted portion 51, the second press-fitted portion 52, and the non-press-fitted portion 55 are cylindrically arranged circumferentially along the nozzle 6. One of the first press-fitted portion 51 and the second press-fitted portion 52 has the press-inserted portion.

In this embodiment, the nozzle 6 is provided as a housing protecting member for protecting wall surface defining the fluid passage in the housing 5 against high-temperature exhaust gas such as high-temperature EGR gas, greater than 500° C. in temperature, passing through the EGR passages 12, 13 in the EGR valve 150. The nozzle 6 is formed of a heat-resistive material such as stainless steel or heat-resistive steel to be in a substantially cylindrical-shape. The nozzle 6 surrounds the wall surface defining the fluid passage, in the vicinity of the full close position of the butterfly valve 1, throughout a predetermined axial length in the housing 5 and entirely in the inner circumferential periphery of the flange fitting portion 42 and the nozzle fitting portion 45. In this embodiment, the midstream EGR passage 12 is in the nozzle fitting portion 45 of the housing 5. The nozzle 6 is provided for protecting the fluid passage in the vicinity of the full close position in the housing 5 from heat transmitted from high-temperature fluid. The nozzle 6 is arranged in the nozzle fitting portion 45, so that the nozzle 6 defines therein the midstream EGR passage 12.

The nozzle 6 is a cylindrical member accommodating therein the butterfly valve 1 being rotatable for communicating and blocking the fluid passage in the nozzle 6. The nozzle 6 has the flange portion (collar portion) 41, which is in a substantially annular shape, and a sleeve portion (cylindrical portion), which is in a substantially cylindrical shape. The flange portion 41 of the nozzle 6 is held in the inner circumferential periphery of the flange fitting portion 42 of the housing 5 by, for example, being press-inserted into the flange fitting portion 42. The nozzle 6 has a cylindrical portion 40, which is held in the inner circumferential periphery of the nozzle fitting portion 45 of the housing 5 by, for example, being press-inserted into the nozzle fitting portion 45.

The flange portion 41 of the nozzle 6 radially outwardly extends from the opening in the upstream axial end of the cylindrical portion 40 of the nozzle 6. The flange portion 41 of the nozzle 6 is fixed to the upstream EGR pipe 4 and the housing 5 using a fastener such as a bolt in a condition where the flange portion 41 is interposed between the connecting end surface 16 of the first flange portion 15 of the upstream EGR pipe 4 and the connecting end surface 47 of the housing 5. The flange portion 41 is interference-fitted to the inner circumferential periphery of the flange fitting portion 42 of the housing 5.

The cylindrical portion 40 of the nozzle 6 has therein the midstream EGR passage 12 defining the gas passage in a substantially cylindrical shape. The cylindrical portion 40 of the nozzle 6 has the fitting protrusion 43, which is in a substantially cylindrical shape, press-fitted to the inner circumferential periphery (second press-fitted portion 52) of the nozzle fitting portion 45 of the housing 5. The cylindrical portion 40 of the nozzle 6 further has the fitting recess 44, which is in a substantially cylindrical shape, loosely fitted to the inner circumferential periphery (non-press-fitted portion 55) of the nozzle fitting portion 45 of the housing 5.

The fitting protrusion 43 is a large diameter portion of the cylindrical portion 40 of the nozzle 6. The fitting protrusion 43 is greater than the fitting recess 44 in outer diameter. The fitting protrusion 43 is located on the side of the flange portion 41 with respect to the fitting recess 44 to be distant from the full close position in the nozzle 6. That is, the fitting protrusion 43 is located on the side of the upstream EGR pipe 4, i.e., in upstream of the fitting recess 44 with respect to the EGR gas flow.

The fitting recess 44 is a small diameter portion of the cylindrical portion 40 of the nozzle 6. The fitting recess 44 is less than the fitting protrusion 43 in outer diameter. The fitting recess 44 is located on the side of the valve shaft 2 with respect to the fitting protrusion 43. That is, the fitting recess 44 is located in downstream of the fitting protrusion 43 with respect to the EGR gas flow. The fitting protrusion 43 and the fitting recess 44 may be in a non-cylindrical shape being in polygonal shape in cross section, for example. The fitting protrusion 43 and the fitting recess 44 may be in a gear shape or a spline shape in cross section. Specifically, protrusions and recesses are alternately arranged one another on the fitting protrusion 43 and/or the fitting recess 44 with respect to the circumferential direction or the axial direction of the nozzle 6.

The flange portion 41 of the nozzle 6 serves as a first press-inserted portion defining a first press-inserted surface, which is most distant from the full close position. The first press-inserted portion of the flange portion 41 is press-inserted into the first press-fitted portion 51 of the flange fitting portion 42. The cylindrical portion 40 of the nozzle 6 serves as a second press-inserted portion defining a second press-inserted surface, which is most distant from the full close position. The second press-inserted portion of the cylindrical portion 40 is press-inserted into the second press-fitted portion 52 of the nozzle fitting portion 45. In the nozzle 6 of this embodiment, the first press-inserted surface of the flange portion 41 and the second press-inserted surface of the fitting protrusion 43 are fitted respectively to the first press-fitted portion 51 of the flange fitting portion 42 and the second press-fitted portion 52 of the nozzle fitting portion 45 of the housing 5 by press-insertion.

The cylindrical portion 40 of the nozzle 6 has the inner circumferential periphery, which defines the fluid passage in the housing 5. The butterfly valve 1 has the seal ring groove into which the seal ring 17 fitted, so that the seal ring 17 defines a seal ring sliding surface 66 on the radially outer side thereof. The inner circumferential periphery of the cylindrical portion 40 in the vicinity of the full close position serves as a seal ring seat surface (contact surface) 61 on which the seal ring sliding surface 66 of the seal ring 17 slides when the butterfly valve 1 is rotated to block the fluid passage to be in the full close position. The downstream axial end of the cylindrical portion 40 of the nozzle 6 has a slit (valve-shaft through hole) 62 through which the valve shaft 2 is inserted.

The cylindrical portion 40 of the nozzle 6 and the inner circumferential periphery of the nozzle fitting portion 45, which defines the fluid passage in the housing 5, define therebetween an air thermal insulating layer (cylindrical space) 65 in a substantially cylindrical shape. In particular, the non-pressure-inserted portion 55 and the fitting recess 44 define the air thermal insulating layer 65 radially therebetween for restricting thermal transmission of high-temperature EGR gas from the nozzle 6 toward the housing 5. The air thermal insulating layer 65 is arranged in the vicinity of a sliding portion in which the seal ring sliding surface of the seal ring 17 slides on the seal ring seat surface 61 of the cylindrical portion 40 of the nozzle 6.

Here, the nozzle fitting portion 45 of the housing 5 has the inner diameter φA mm, and the fitting recess 44 of the nozzle 6 has the outer diameter φB mm. The air thermal insulating layer 65 has the width C mm. C=φA−φB. Preferably, the width C is in the range between 0.8 and 3.0 mm. More preferably, the width C is in the range between 1.0 and 2.0 mm. The width C is, most desirably, about 1.6 mm.

In this embodiment, the EGR apparatus has the substantially C-shaped seal ring 17 fitted to the seal ring groove of the butterfly valve 1. The seal ring 17 is capable of applying sealing force on the seal ring seat surface 61 of the cylindrical portion 40 of the nozzle 6 by utilizing radial tension acting to radially expand the seal ring 17.

This EGR valve 150 of the EGR apparatus has an EGR leakage dead band, in which leakage of EGR gas does not substantially increase, in the vicinity of the full close position. In the EGR leakage dead band, leakage of EGR gas does not substantially increase because of expansion caused by the tension radially expanding the seal ring 17. Specifically, the seal ring 17 is applied with the tension thereof to radially outwardly expand, so that the seal ring sliding surface 66 of the seal ring 17 maintains being tightly in contact with the seal ring seat surface 61 of the cylindrical portion 40, even when the position of the butterfly valve 1 is slightly out of the full close position. The seal ring 17 maintains radially outwardly expanding in a range within a tension limit in which the seal ring 17 is capable of radially outwardly expanding by the tension thereof. In this embodiment, the air thermal insulating layer 65 is located in the vicinity of the sliding portion, and extends in a range greater than the EGR leakage dead band.

Next, the operation of the EGR apparatus is described in detail with reference to FIG. 1.

When the ignition switch is turned ON (IG. ON), the ECU performs a feedback control of electricity supplied to the electric motor, excluding cold start of the engine 500. In this condition, the ECU controls the electric motor such that an actual valve position detected using the EGR flow sensor 27 coincides with a target valve position, which is set in accordance with the operating condition of the engine 500. The actual valve position corresponds to an actual EGR amount. The target valve position corresponds to a target EGR amount.

The electric motor is supplied with electricity, so that the motor shaft of the electric motor rotates. The driving force (output torque) of the electric motor is transmitted to the valve gear 20 via the pinion gear and the intermediate reduction gear. As the valve gear 20 rotates, the valve shaft 2 rotates for a predetermined angle, so that the butterfly valve 1 is rotated from the full close position toward the full open position in the EGR valve 150.

The butterfly valve 1 is rotated to the valve position corresponding to the control target against resilience of the return spring 31. The combustion chamber 500a of the cylinder of the engine 500 discharges exhaust gas such as high-temperature EGR gas higher than 500° C. in temperature.

As referred to FIGS. 1, 5, the exhaust gas is partially recirculated from the exhaust passage defined in the exhaust pipe 502 into the intake passage defined in the intake pipe 501 after passing through the upstream EGR passage 11 defined in the upstream EGR pipe 4, the EGR passages 12, 13 defined in the EGR valve 150, and the EGR passage 18 defined in the downstream EGR pipe 10.

When the butterfly valve 1 is rotated to the full close position, the ECU terminates electricity supplied to the electric motor or restricts electricity supplied to the electric motor. Thus, the butterfly valve 1 returns to the full close position, which is the neutral position, in which resilience of the return spring 31 and resilience of the default spring 32 are balanced.

In this condition, the seal ring sliding surface 66 of the seal ring 17, which is provided to the outer circumferential periphery of the butterfly valve 1, sticks to the seal ring seat surface 61 of the nozzle 6 by the radially expanding tension of the seal ring 17. Thus, the seal ring sliding surface 66 of the seal ring 17 tightly makes contact with the seal ring seat surface 61 of the cylindrical portion 40 of the nozzle 6.

The gap between the outer circumferential periphery of the butterfly valve 1 and the seal ring seat surface 61 of the nozzle 6 is sealed. When the butterfly valve 1 is maintained at the full close position, leakage of EGR gas is steadily restricted, so that EGR gas does not flow into intake air.

As described above, in the EGR valve 150 of this embodiment, the housing 5 has the EGR passages 12, 13, which is blocked and communicated by the butterfly valve 1. The housing 5 has the first and second press-fitted portions 51, 52 to which the first press-inserted surface of the flange portion 41 and the second press-inserted surface of the fitting protrusion 43 are respectively press-inserted for protecting the housing 5 from heat of the high-temperature EGR gas passing through the EGR passages 12, 13 in the EGR valve 150. The flange portion 41 and the cylindrical portion 40 of the nozzle 6 are inserted respectively into the flange-fitting hole and a nozzle-fitting hole of the housing 5, thereby being press-fitted respectively to the inner circumferential peripheries of the flange fitting portion 42 and the nozzle fitting portion 45. Thus, the nozzle 6 is assembled to the housing 5.

The housing 5 is formed of aluminum die cast, which is inexpensive and excellent in dimensional accuracy. The nozzle 6 is formed of stainless steel or a heat-resistive material excellent in durability in high temperature. The cylindrical portion 40 of the nozzle 6 surrounds the fluid passage in the vicinity of the full close position in the housing 5. In this structure, the fluid passage in the vicinity of the full close position in the housing 5 is not exposed directly to high-temperature EGR gas passing through the midstream EGR passage 12 in the EGR valve 150. Thus, the housing 5 is formed of aluminum die cast, which is advantageous in mass productivity, high dimensional accuracy, and smoothness of surface thereof, so that aluminum die cast is advantageous in reduction of machining work, even though being disadvantageous in low melting point and durability against high-temperature. Furthermore, the nozzle 6 is capable of protecting the housing 5 against heat of high-temperature EGR gas passing through the EGR passages 12, 13 in the EGR valve 150. Therefore, the disadvantage of the aluminum die cast constructing the housing 5 can be compensated for by additionally providing the nozzle 6. Thus, heat resistance of the EGR valve 150, in particular, the housing 5 can be enhanced.

In this embodiment, the EGR valve 150 has the air thermal insulating layer 65, which is provided between the wall surface of the housing 5 and outer circumferential periphery of the nozzle 6 other than the first and second press-fitted portions 51, 52 for restricting thermal transmission from high-temperature EGR gas in the nozzle 6 toward the housing 5. Specifically, the inner circumferential periphery of the non-press-fitted portion 55 of the nozzle fitting portion 45 of the housing 5 and the outer circumferential periphery of the fitting recess 44 of the nozzle 6 define the cylindrical space as the air thermal insulating layer 65.

In this structure, even when heat of high-temperature EGR gas, which passes through the EGR passages 12, 13 in the EGR valve 150, is transmitted to the nozzle 6, thermal transmission from the nozzle 6 to the housing 5 can be restricted.

Thus, temperature of the housing 5 can be restricted from becoming greater than the allowable temperature limit thereof.

Thus, the housing 5 can be formed of aluminum die cast, which is inexpensive and excellent in dimensional accuracy, and thermal transmission of high-temperature EGR gas from the nozzle 6 toward the housing 5 can be restricted. The shape of the housing 5 can be maintained, so that dimensional accuracy such as circularity of the midstream EGR passage 12 can be maintained. Furthermore, growth of cast defect in the aluminum die cast of the housing 5 can be restricted, so that the appearance and quality of the housing 5 can be maintained.

The housing 5 can be formed of aluminum die cast as a construction material, so that the housing 5 can be enhanced in dimensional accuracy, compared with being formed of cast iron. Thus, most of the aluminum die cast product of the housing 5 need not machining work. Thus, manufacturing cost of the housing 5 can be reduced. Temperature of the housing 5 can be restricted from becoming greater than the allowable temperature limit thereof, so that heat resistance of the EGR valve 150, in particular, the housing 5 can be enhanced.

In this structure, thermal transmission of high-temperature EGR gas, which passes through the EGR passages 12, 13 in the EGR valve 150, can be restricted relative to the housing 5 via the nozzle 6. Thus, thermal effect imposed to the valve bearing portion 33 of the housing 5 can be restricted. The oil seal 38 such as a seal rubber may be provided to the valve bearing portion 33 of the housing 5 for restricting lubricant from leaking into the butterfly valve 102 on the side of the EGR passage. Even in this structure, the oil seal 38 can be protected from deterioration caused by heat transmitted from the high-temperature exhaust gas. Thus, the sealing performance of the oil seal 38 can be maintained. The metallic bushing 37 may be substituted to a sintered oil bearing, and the sintered oil bearing may be provided in the valve bearing portion 33 of the housing 5. Even in this structure, oil can be protected from weeping out of the sintered oil bearing due to heat transmitted from the high-temperature exhaust gas. Thus, the lubricating performance of the sintered oil bearing can be maintained.

The air thermal insulating layer 65 is arranged radially outer side in the vicinity of the sliding portion in which the seal ring sliding surface 66 of the seal ring 17 slides on the seal ring seat surface 61 of the cylindrical portion 40 of the nozzle 6. The air thermal insulating layer 65 is located on the radially outer side of the sliding portion, and has the axial length greater than the axial length of the EGR leakage dead band in the sliding portion. In this structure, even if the housing 5 is deformed due to high-temperature EGR gas passing through the EGR passages 12, 13 in the EGR valve 150, the deformation of the housing 5 may not exert influence directly to the seal ring seat surface 61 of the nozzle 6 defining the sliding portion in the vicinity of the full close position.

In the EGR valve 150 of this embodiment, the cylindrical portion 40 of the nozzle 6 has the outer circumferential peripheries, which are distant from the full close position, serving as the first and second press-inserted surfaces, which are interference-fitted, e.g., press-fitted, to the first and second press-fitted portions 51, 52 of the housing 5. In this structure, the first and second press-inserted portions of the nozzle 6 are away from portions in the vicinity of the full close position of the cylindrical portion 40 of the nozzle 6. Therefore, even the flange portion 41 and the fitting protrusion 43 of the nozzle 6 are press-inserted respectively into the first and second press-fitted portions 51, 52, the nozzle 6 may not exert influence directly to the seal ring seat surface 61 in the vicinity of the full close position of the cylindrical portion 40 of the nozzle 6. Thus, deformation of the seal ring seat surface 61 of the cylindrical portion 40 of the nozzle 6 can be reduced when the flange portion 41 and the cylindrical portion 40 of the nozzle 6 are press-inserted into the first and second press-fitted portions 51, 52 of the housing 5.

The dimension of the gap between the outer circumferential periphery of the butterfly valve 1 and the seal ring seat surface 61 of the cylindrical portion 40 can be maintained, when the flange portion 41 and the cylindrical portion 40 of the nozzle 6 are press-inserted respectively into the first and second press-fitted portions 51, 52 of the housing 5. Therefore, increase in leakage of EGR gas can be restricted when the butterfly valve 1 is rotated to block the fluid passage in the full close position. Thus, when the butterfly valve 1 is rotated to be in the full close position, contact and interference can be restricted between the outer circumferential periphery of the butterfly valve 1 and the seal ring seat surface 61 of the cylindrical portion 40, before the butterfly valve 1 is in the full close position. Thus, the butterfly valve 1 can be restricted from causing malfunction or valve lock (valve stick).

In this embodiment, the flange portion 41 of the nozzle 6 is fixed to the upstream EGR pipe 4 and the housing 5 using a fastener such as a bolt in a condition where the flange portion 41 is interposed between the connecting end surface 16 of the first flange portion 15 of the upstream EGR pipe 4 and the connecting end surface 47 of the housing 5.

The air thermal insulating layer 65 is provided between the wall surface of the housing 5, other than the first and second press-fitted portions 51, 52, and the outer circumferential periphery of the nozzle 6 for restricting thermal transmission of high-temperature EGR gas from the nozzle 6 toward the housing 5. In this structure, by providing the air thermal insulating layer 65, an interference margin, e.g., length between the first and second press-fitted portions 51, 52 of the housing 5 and the first and second press-inserted surfaces of the nozzle 6 may become insufficient for holding the nozzle 6 by being press-inserted into the housing 5. However, in the above structure, even when the interference margin becomes insufficient, detachment of the nozzle 6 from the housing 5 can be steadily restricted by being fixed to the upstream EGR pipe 4 and the housing 5 using, for example, the fastener, so that the nozzle 6 can be steadily held in the housing 5.

Thus, the interference margin between the first and second press-fitted portions 51, 52 of the housing 5 and the first and second press-inserted surfaces of the nozzle 6 may be produced by minimum press-insertion length between the housing 5 and the nozzle 6. Therefore, the axial length of the cylindrical portion 40 of the nozzle 6 corresponding to the axial length of the midstream EGR passage 12 can be reduced. Consequently, reduction in size and weight of the EGR valve 150 can be achieved.

Second Embodiment

Figure 2:
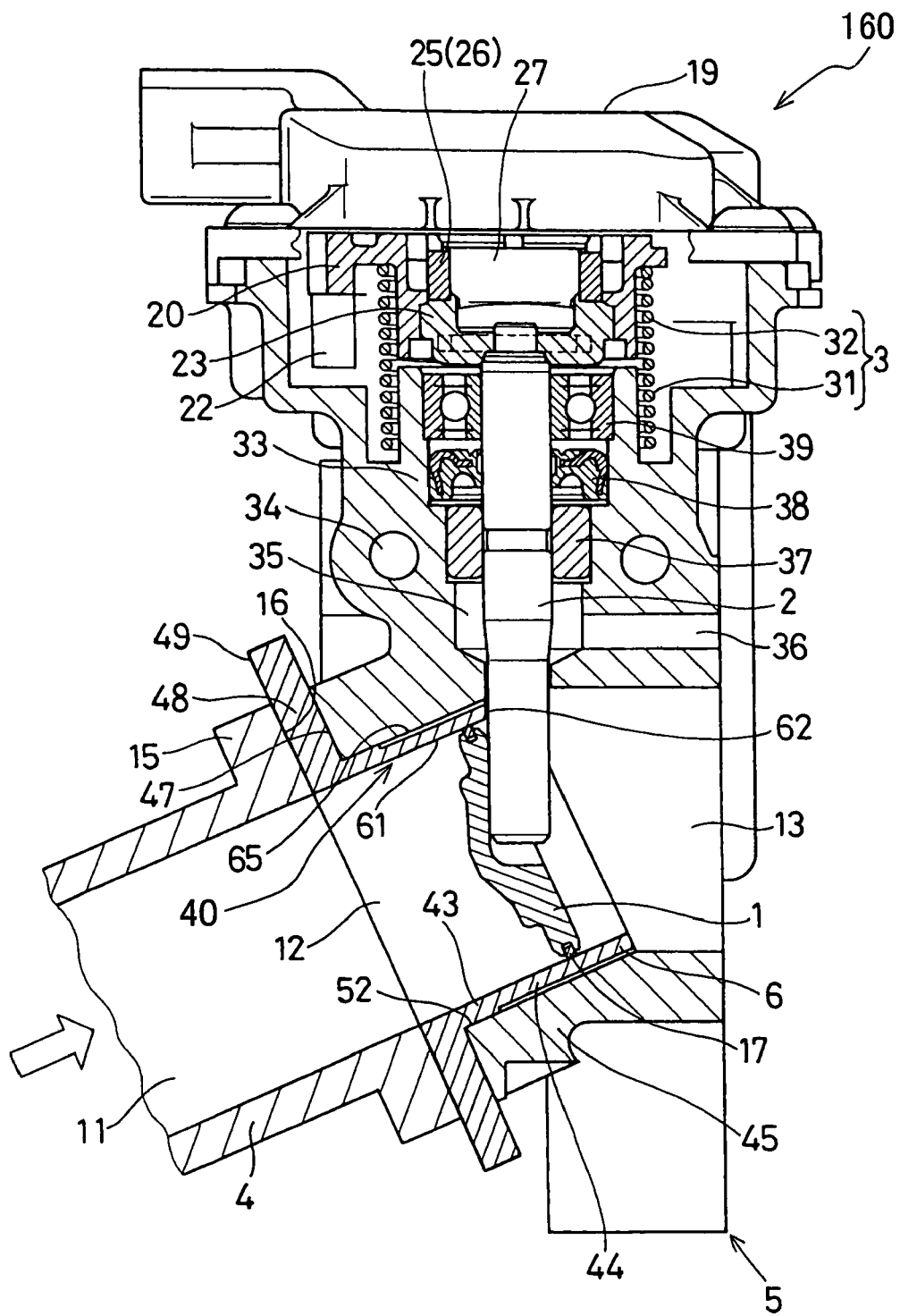
FIG. 2 is a sectional view showing an EGR valve according to a second embodiment.

As shown in FIG. 2, in an EGR valve 160 of this embodiment, the flange fitting portion 42 described in the first embodiment is omitted from the housing 5, and a flange portion 48 is provided to the nozzle 6 instead of the flange portion 41 described in the first embodiment. The flange portion 48 in this embodiment is formed by radially outwardly enlarging the flange portion 41 in the first embodiment. That is, the flange portion 48 in this embodiment has the outer diameter greater than the outer diameter of the flange portion 41 in the first embodiment. The flange portion 48 of the nozzle 6 has the annular circumferential periphery having a heat-radiating portion 49, which radially outwardly protrudes for radiating heat to air flowing outside the upstream EGR pipe 4 and the housing 5. The heat-radiating portion 49 constructs a heat-radiating fin radially outwardly protruding beyond the outer periphery of the first flange portion 15 of the upstream EGR pipe 4 and the nozzle fitting portion 45 of the housing 5. The heat-radiating portion 49 is capable of radiating heat, which is transmitted from high-temperature EGR gas in the midstream EGR passage 12 toward the nozzle 6 in the EGR valve 160, to air such as wind flowing along the outer peripheries of the upstream EGR pipe 4 and the housing 5. That is, the heat-radiating portion 49 is exposed to air flowing around the upstream EGR pipe 4 and the housing 5.

In this structure, heat, which is transmitted from high-temperature EGR gas in the midstream EGR passage 12 toward the nozzle 6 in the EGR valve 160, can be effectively radiated to air flowing around the upstream EGR pipe 4 and the housing 5 via the heat-radiating portion 49 of the nozzle 6. In this structure, even when heat of high-temperature EGR gas, which passes through the EGR passages 12, 13 in the EGR valve 160, is transmitted to the nozzle 6, thermal transmission from the nozzle 6 to the housing 5 can be further restricted. Thus, temperature of the housing 5 can be further restricted from becoming greater than the allowable temperature limit thereof. Temperature of the housing 5 can be restricted from becoming greater than the allowable temperature limit thereof, so that heat resistance of the EGR valve 160, in particular, the housing 5 can be enhanced.

The outer circumferential periphery of the flange portion 48 of the nozzle 6 may be exposed in the outer circumferential periphery of the first flange portion 15 of the upstream EGR pipe 4 and the outer circumferential periphery of the nozzle fitting portion 45 of the housing 5. The outer circumferential periphery of the flange portion 48 of the nozzle 6 may have protruding portions, which protrudes beyond the outer circumferential peripheries of the first flange portion 15 of the upstream EGR pipe 4 and the nozzle fitting portion 45 of the housing 5, and recessed portions recessed below the outer circumferential peripheries of the first flange portion 15 and the nozzle fitting portion 45. For example, the protruding portions and the recessed portions may be circumferentially arranged alternately to each other. This structure can be produced by forming the outer circumferential periphery of the flange portion 48 of the nozzle 6 to be in a gear-shaped, for example.

Third Embodiment

Figure 3:
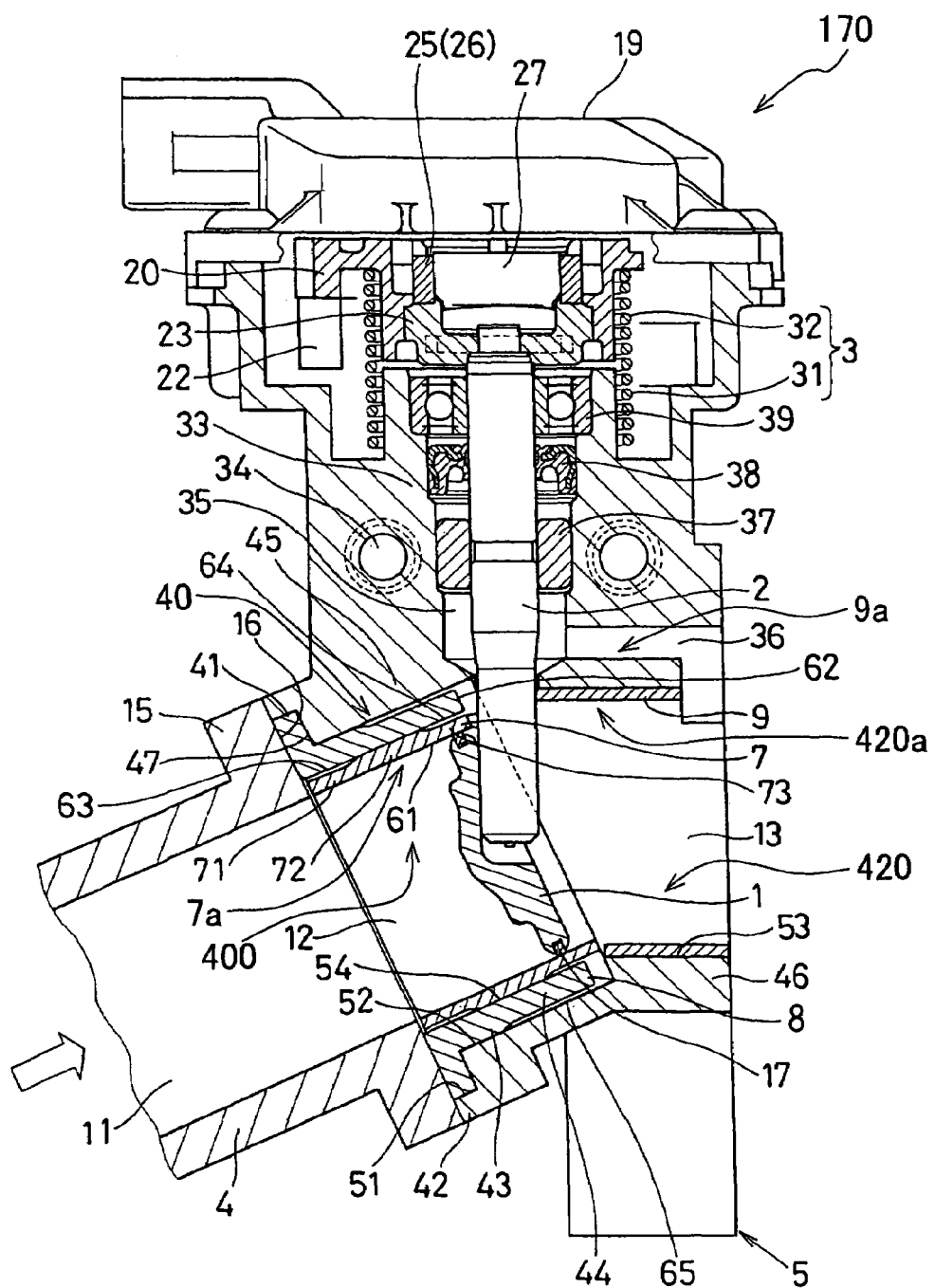
FIG. 3 is a sectional view showing an EGR valve according to a third embodiment.

As shown in FIG. 3, an EGR valve 170 of this embodiment has the housing 5 having first, second, and third press-fitted portions 51 to 53. The EGR valve 170 further includes first and second housing protection members 400, 420 that are press-inserted into the first, second, and third press-fitted portions 51 to 53 of the housing 5 for protecting the housing 5 from heat of high-temperature gas passing through the EGR passages 12, 13 in the EGR valve 170. The first housing protection member 400 surrounds the wall surface in the vicinity of the full close position in the housing 5. The second housing protection member 420 surrounds the wall surface downstream of the full close position in the housing 5 with respect to the EGR gas flow. The housing 5 is formed of aluminum die cast, which is inexpensive and excellent in dimensional accuracy, similarly to the first embodiment. The housing 5 includes the flange fitting portion 42, the nozzle fitting portion 45, and a downstream-nozzle fitting portion 46. The flange fitting portion 42 is fitted to the flange portion 41 of the nozzle 6. The nozzle fitting portion 45 is fitted to the cylindrical portion 40 of the first housing protection member 400. The downstream-nozzle fitting portion 46 is fitted to a cylindrical portion 420a of the second housing protection member 420. The first press-fitted portion 51 is provided to the inner circumferential periphery of the flange fitting portion 42. The second press-fitted portion 52 is provided to the inner circumferential periphery of the nozzle fitting portion 45. The third press-fitted portion 53 is provided to the inner circumferential periphery of the downstream-nozzle fitting portion 46. The downstream-nozzle fitting portion 46 therein has a nozzle-fitting hole, which is substantially circular in cross section.

The first housing protection member 400 has a double-pipe structure constructed of a radially inner cylindrical member (radially inner first nozzle) 7 and a radially outer cylindrical member (radially outer first nozzle) 8. The radially inner first nozzle 7 defines therein the midstream EGR passage 12, which is communicated and blocked by the butterfly valve 1. The radially outer first nozzle 8 is press-inserted into the first and second press-fitted portions 51, 52 of the housing 5. The first housing protection member 400 surrounds the wall surface in the upstream of the valve shaft 2 relative to the EGR gas flow. The first housing protection member 400 surrounds the fluid passage in the vicinity of the full close position in the housing 5. In this structure, the fluid passage in the vicinity of the full close position in the housing 5 is not exposed directly to high-temperature EGR gas.

The radially inner first nozzle 7 is formed of, for example, stainless steel or heat-resistive steel. The radially inner first nozzle 7 has a cylindrical portion 7a that is arranged on the radially inner side of the radially outer first nozzle 8 for rotatably accommodating therein the butterfly valve 1 to communicate and block the fluid passage therein. The cylindrical portion 7a of the radially inner first nozzle 7 has the inner circumferential periphery defining the fluid passage in the housing 5 The inner circumferential periphery of the cylindrical portion 7a defines the seal ring seat surface 61 in the vicinity of the full close position. The seal ring sliding surface of the seal ring 17 provided to the outer circumferential periphery of the butterfly valve 1 is slidable on the seal ring seat surface 61 in the vicinity of the full close position, similarly to the first embodiment. The downstream axial end of the cylindrical portion 7a of the radially inner first nozzle 7 has the slit (valve-shaft through hole) 62 through which the valve shaft 2 is inserted, similarly to the first embodiment.

The cylindrical portion 7a of the radially inner first nozzle 7 defines therein the fluid passage in a substantially cylindrical shape. The cylindrical portion 7a includes a fitting recess 71, a fitting protrusion 72, and a fitting recess 73, which are respectively in substantially cylindrical shapes. The fitting recess 71 is loosely fitted to the inner circumferential periphery of the radially outer first nozzle 8. The fitting protrusion 72 is interference-fitted to the inner circumferential periphery of the radially outer first nozzle 8. The fitting recess 73 is loosely fitted to the inner circumferential periphery of the radially outer first nozzle 8.

The fitting recess 71 is a small diameter portion of the cylindrical portion 7a of the radially inner first nozzle 7. The fitting recess 71 is less than the fitting protrusion 72 in outer diameter. The fitting recess 71 is located on the side of the first flange portion 15 and the upstream EGR pipe 4 with respect to the fitting protrusion 72. That is, the fitting recess 71 is located in upstream of the fitting protrusion 72 with respect to the EGR gas flow. The fitting protrusion 72 is located between the fitting recesses 71, 73, and is distant from the full close position. The fitting protrusion 72 is greater than both the fitting recesses 71, 73 in outer diameter. The fitting recess 73 is a small diameter portion of the cylindrical portion 7a of the radially inner first nozzle 7. The fitting recess 73 is less than the fitting protrusion 72 in outer diameter. The fitting recess 73 is located on the side of the valve shaft 2 with respect to the fitting protrusion 72. That is, the fitting recess 73 is located in downstream of the fitting protrusion 72 with respect to the EGR gas flow.

The fitting recesses 71, 73 may be the same in outer diameter. Alternatively, the fitting recesses 71, 73 may be different from each other in outer diameter. Each of the fitting recess 71, the fitting protrusion 72, and the fitting recess 73 may be in a non-cylindrical shape being in polygonal shape in cross section, for example. Each of the fitting recess 71, the fitting protrusion 72, and the fitting recess 73 may be in a gear shape or a spline shape in cross section. Specifically, protrusions and recesses may be alternately arranged one another on at least one of the fitting recess 71, the fitting protrusion 72, and the fitting recess 73 with respect to the circumferential direction or the axial direction of the cylindrical portion 7a of the radially inner first nozzle 7.

The cylindrical portion 7a of the radially inner first nozzle 7 serves as a press-inserted portion defining a press-inserted surface, which is distant from the full close position. The second press-inserted portion of the cylindrical portion 7a is press-inserted into the inner circumferential periphery of the radially outer first nozzle 8. Thus, the radially inner first nozzle 7 is fitted or fixed to the inner circumferential periphery of the radially outer first nozzle 8 by, for example, press-inserting the surface of the fitting protrusion 72. The cylindrical portion 7a of the radially inner first nozzle 7 and the inner circumferential periphery of the cylindrical portion 40 of the radially outer first nozzle 8 define therebetween a first air thermal insulating layer 63 and a second air thermal insulating layer 64 respectively being in substantially cylindrical shapes. The first and second air thermal insulating layers 63, 64 respectively serve as cylindrical spaces. The first and second air thermal insulating layers 63, 64 are provided for restricting thermal transmission of high-temperature EGR gas from the radially inner first nozzle 7 toward the radially outer first nozzle 8. The first air thermal insulating layer 63 is arranged on the side of the upstream axial end of the cylindrical portion 7a of the radially inner first nozzle 7. The second air thermal insulating layer 64 is arranged in the vicinity of a sliding portion in which the seal ring sliding surface of the seal ring 17 slides on the seal ring seat surface 61 of the cylindrical portion 7a of the radially inner first nozzle 7.

The radially outer first nozzle 8 is formed of, for example, stainless steel or heat resistive steel. The radially outer first nozzle 8 is arranged on the radially outer side of the radially inner first nozzle 7. The radially outer first nozzle 8 surrounds the wall surface defining the fluid passage, in the vicinity of the full close position of the butterfly valve 1, throughout a predetermined axial length in the housing 5 and entirely in the inner circumferential periphery of the flange fitting portion 42 and the nozzle fitting portion 45. In this structure, the fluid passage in the vicinity of the full close position in the housing 5 is not exposed directly to high-temperature EGR gas.

In this embodiment, the radially outer first nozzle 8 includes the flange portion 41 and the cylindrical portion 40, similarly to the nozzle 6 in the first embodiment. The cylindrical portion 40 defines therein the midstream EGR passage 12. The flange portion 41 of the radially outer first nozzle 8 is fixed to the upstream EGR pipe 4 and the housing 5 using a fastener such as a bolt in a condition where the first flange portion 41 is interposed between the connecting end surface 16 of the first flange portion 15 of the upstream EGR pipe 4 and the connecting end surface 47 of the housing 5. The cylindrical portion 40 of the radially outer first nozzle 8 includes the fitting protrusion 43, which is provided at the location distant from the full close position, and the fitting recess 44, which is less than the fitting protrusion 43 in outer diameter, similarly to the cylindrical portion 40 of the nozzle 6 in the first embodiment.

The flange portion 41 of the radially outer first nozzle 8 serves as a first press-inserted portion defining a first press-inserted surface, which is most distant from the full close position. The first press-inserted portion of the flange portion 41 is press-inserted into the first press-fitted portion 51 of the flange fitting portion 42. The cylindrical portion 40 of the radially outer first nozzle 8 serves as a second press-inserted portion defining a second press-inserted surface, which is distant from the full close position. The second press-inserted portion of the cylindrical portion 40 is press-inserted into the second press-fitted portion 52 of the nozzle fitting portion 45.

The cylindrical portion 40 of the radially outer first nozzle 8 has the inner circumferential periphery defining a press-fitting portion 54 to which the fitting protrusion 72 of the radially inner first nozzle 7 is press-inserted. The press-fitting portion 54 serves as a press-inserted portion of the radially outer first nozzle 8. The press-fitting portion 54 is circumferentially arranged to surround the outer circumferential periphery of the fitting protrusion 72 of the radially inner first nozzle 7.

Thus, in this embodiment, the radially inner first nozzle 7 is fitted or fixed to the press-fitting portion 54 of the cylindrical portion 40 of the radially outer first nozzle 8 by, for example, press-inserting the surface of the fitting protrusion 72. The first press-inserted surface of the flange portion 41 and the second press-inserted surface of the fitting protrusion 43 are fitted respectively to the first press-fitted portion 51 of the flange fitting portion 42 of the housing 5 and the second press-fitted portion 52 of the nozzle fitting portion 45 by press-insertion.

The cylindrical portion 40 of the radially outer first nozzle 8 and the inner circumferential periphery of the nozzle fitting portion 45, which defines the fluid passage in the housing 5, define therebetween the air thermal insulating layer 65 in a substantially cylindrical shape, similarly to the cylindrical portion 40 of the nozzle 6 in the first embodiment. The air thermal insulating layer 65 is provided for restricting thermal transmission of high-temperature EGR gas from the radially outer first nozzle 8 toward the housing 5. The air thermal insulating layer 65 is arranged on the radially outer side of the sliding portion in which the seal ring sliding surface of the seal ring 17 slides on the seal ring seat surface 61 of the cylindrical portion 7a of the radially inner first nozzle 7.

The second housing protection member 420 surrounds the wall surface in the downstream of the valve shaft 2 relative to the EGR gas flow. The second housing protection member 420 surrounds the fluid passage in the vicinity of the full close position downstream relative to the EGR gas flow in the housing 5. The second housing protection member 420 is constructed of a cylindrical member (second nozzle) 9.

The second nozzle 9 is formed of, for example, stainless steel or heat resistive steel. The second nozzle 9 surrounds the fluid passage, downstream of the full close position of the butterfly valve 1, relative to the EGR gas flow, throughout a predetermined axial length in the housing 5 and entirely in the inner circumferential periphery of the downstream-nozzle fitting portion 46 of the housing 5. In this structure, the fluid passage in the downstream of the full close position in the housing 5 is not exposed directly to high-temperature EGR gas.

The second nozzle 9 includes a cylindrical portion 9a defining therein the downstream EGR passage 13. The outer circumferential periphery of the cylindrical portion 9a of the second nozzle 9 serves as a third press-inserted portion defining a third press-inserted surface. The third press-inserted portion of the second nozzle 9 is press-inserted into the third press-fitted portion 53 of the downstream-nozzle fitting portion 46 of the housing 5.

As described above, in this embodiment of the EGR valve 170, the first housing protection member 400 surrounds the fluid passage in the vicinity of the fill-close position in the housing 5. The first housing protection member 400 has a double-pipe structure constructed of the radially inner first nozzle 7 and the radially outer first nozzle 8. Furthermore, the second housing protection member 420 constructed of the second nozzle 9 surrounds the fluid passage downstream of the full close position relative to the EGR gas flow in the housing 5. Thus, heat resistance of the EGR valve 160, in particular, the housing 5 can be enhanced.

Fourth Embodiment

Figure 4:
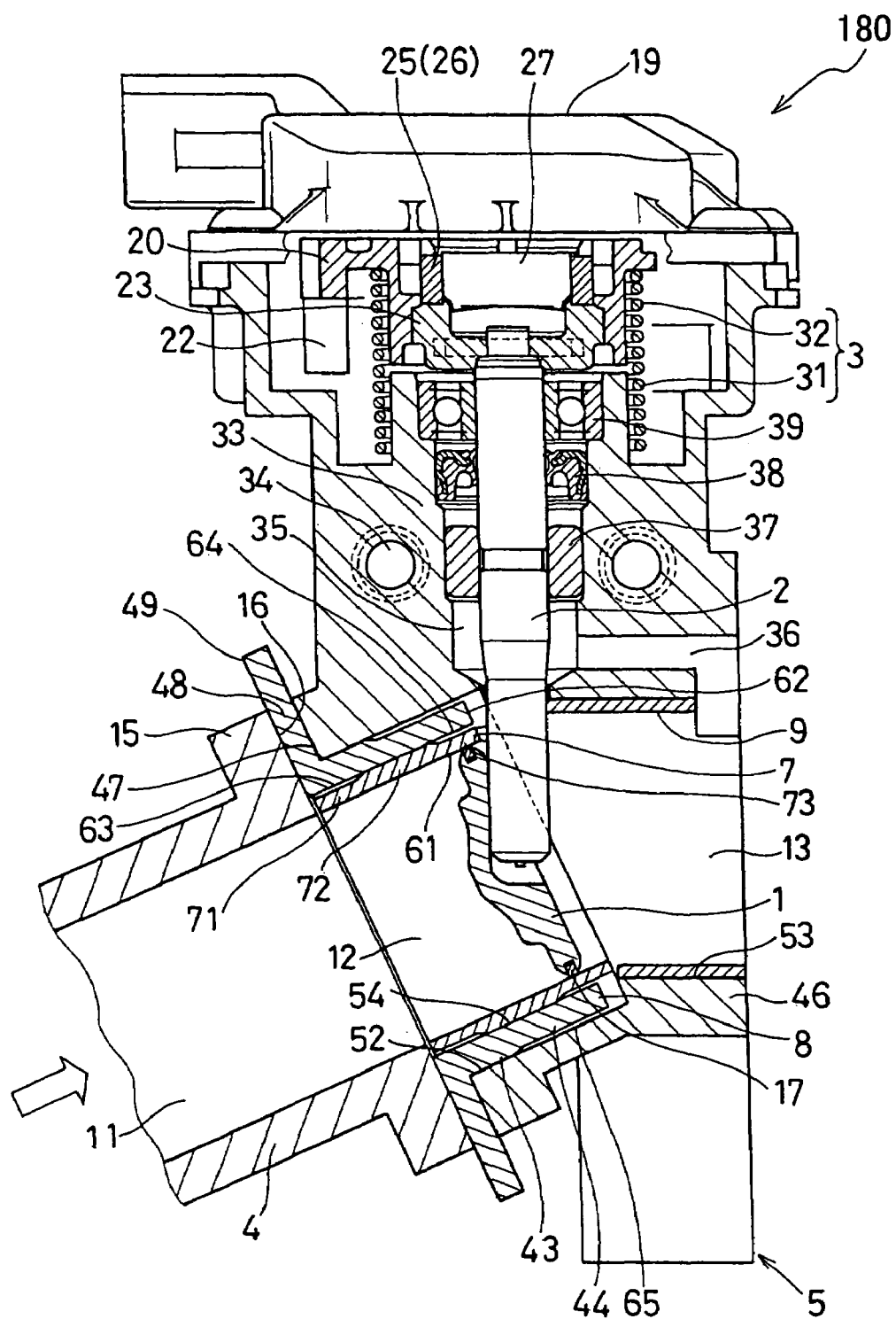
FIG. 4 is a sectional view showing an EGR valve according to a fourth embodiment.

As shown in FIG. 4, in an EGR valve 180 of this embodiment, the flange fitting portion 42 described in the third embodiment is omitted from the housing 5, and a flange portion 48 is provided to the radially outer first nozzle 8 instead of the flange portion 41 in the third embodiment. The flange portion 48 in this embodiment is formed by radially outwardly enlarging the flange portion 41 in the third embodiment. That is, the flange portion 48 in this embodiment has the outer diameter greater than the outer diameter of the flange portion 41 in the third embodiment. The flange portion 48 has the annular circumferential periphery having a heat-radiating portion 49, which radially outwardly protrudes for radiating heat to air flowing outside the upstream EGR pipe 4 and the housing 5. In this structure, the EGR valve 180 is capable of producing an effect similarly to the EGR valve 160 in the second embodiment.

(Modification)

In the above embodiments, the valve actuator for the butterfly valve 1 of the EGR valve is constructed of the electric motor and the electric actuator including a transmission device such as reduction gears.

Alternatively, the valve actuator may be constructed of a negative-pressure actuator, which includes a solenoid control valve or an electric negative pressure control valve. The valve actuator may be constructed of a solenoid actuator such as an electromagnetically controlled fluid valve.

The seal ring groove (annular groove) need not be provided on the outer circumferential periphery of the butterfly valve 1. The seal ring 17 need not be provided on the outer circumferential periphery of the butterfly valve 1. In this structure, the seal ring 17 is not necessary, so that reduction in both number of components and manufacturing process can be achieved. The coil spring 3 need not be provided. In this structure, the coil spring 3 is not necessary, so that reduction in both number of components and manufacturing process can be achieved.

The above structure as a fluid control valve in the above embodiments may be applied to an intake air control valve such as a throttle valve for controlling intake air drawn into a combustion chamber of an engine, instead of being applied to the EGR valve in the above embodiments. Alternatively, the above structure as a fluid control valve in the above embodiments may be applied to either an exhaust gas control valve, for controlling exhaust gas discharged from a combustion chamber of an engine, or an idling rotation control valve for controlling intake air bypassing a throttle valve, instead of being applied to the EGR valve. The above structure as a fluid control valve in the above embodiments may be applied to either a fluid passage open/close valve, a fluid passage switching valve, or a fluidic pressure control valve, instead of being applied as a fluid flow control valve in the above embodiments. The above structure as a fluid control valve in the above embodiments may be applied to an intake air control valve such as a tumble flow control valve and a swirl flow control valve. The above structure as a fluid control valve may be applied to a variable intake control valve for manipulating either the length of a fluid passage or the cross section of a fluid passage. The engine 500 may be a gasoline engine.

In the above first and second embodiments, the nozzle 6 surrounds the midstream EGR passage 12 in the vicinity of the full close position in the housing 5, and a housing protection member does not surround the downstream EGR passage 13 downstream of the full close position in the housing 5. Alternatively, in the above first and second embodiments, the nozzle 6 may surround the midstream EGR passage 12 in the vicinity of the full close position in the housing 5, and a housing protection member may be provided to surround the downstream EGR passage 13 downstream of the full close position in the housing 5, similarly to the third and fourth embodiments.

The above processings such as calculations and determinations are not limited being executed by the ECU. The control unit may have various structures including the ECU shown as an example.

The above structures of the embodiments can be combined as appropriate.

Various modifications and alternations may be diversely made to the above embodiments without departing from the spirit of the present invention.

What is claimed is:

1. A fluid control valve comprising:
    a housing defining therein a fluid passage;
    a valve member for controlling a fluid flow in the fluid passage by communicating and blocking by the fluid passage; and
    a protection member being press-inserted into the housing for protecting the housing from heat of the fluid flow in the fluid passage,
    wherein the housing is formed by die casting of an aluminum material, and
    the protection member and a wall surface, which defines the fluid passage in the housing, define therebetween a thermal insulating layer for restricting thermal transmission of the fluid flow from the protection member toward the housing,
    the housing has a fitting portion to which the protection member is fitted,
    the protection member has a fitting protrusion and a fitting recess,
    the fitting protrusion is interference-fitted to an inner circumferential periphery of the fitting portion,
    the fitting recess has an outer diameter less than an outer diameter of the fitting protrusion,
    the fitting recess is loose-fitted to the inner circumferential periphery of the fitting portion, and
    the thermal insulating layer is one of a cylindrical space and an annular space defined between the inner circumferential periphery of the fitting portion and an outer circumferential periphery of the fitting recess.

2. A fluid control valve comprising:
a housing defining therein a fluid passage;
a valve member for controlling a fluid flow in the fluid passage by communicating and blocking by the fluid passage; and
a protection member being press-inserted into the housing for protecting the housing from heat of the fluid flow in the fluid passage,
wherein the housing is formed by die casting of an aluminum material,
the protection member and a wall surface, which defines the fluid passage in the housing, define therebetween a thermal insulating layer for restricting thermal transmission of the fluid flow from the protection member toward the housing,
the housing has a second connecting end surface,
the housing has a fitting portion to which the protection member is press-inserted,
the protection member has a flange portion in a substantially annular shape, and
the flange portion is exposed from the second connecting end surface of the housing.

3. A fluid control valve comprising:
a housing defining therein a fluid passage;
a valve member for controlling a fluid flow in the fluid passage by communicating and blocking by the fluid passage; and
a protection member being press-inserted into the housing for protecting the housing from heat of the fluid flow in the fluid passage,
wherein the housing is formed by die casting of an aluminum material,
the protection member and a wall surface, which defines the fluid passage in the housing, define therebetween a thermal insulating layer for restricting thermal transmission of the fluid flow from the protection member toward the housing,
the valve member is a butterfly valve in a substantially disc-shape,
the butterfly valve is rotatable relative to the housing for blocking and communicating the fluid passage,
the butterfly valve has an outer circumferential periphery defining a full close position with respect to the protection member when a gap between the outer circumferential periphery of the butterfly valve and the protection member is minimum,
the protection member has an inner circumferential periphery defining a contact surface in the vicinity of the full close position,
the outer circumferential periphery of the butterfly valve defines a sliding surface that slides on the contact surface of the protection member when the butterfly valve moves to block the fluid passage,
the housing has a fitting portion to which the protection member is press-inserted,
the protection member has an outer circumferential periphery defining a press-inserted surface via which the protection member is interference-fitted to the fitting portion of the housing, and
the press-inserted surface is distant from the full close position.

4. A fluid control valve comprising:
a housing defining therein a fluid passage;
a valve member for controlling a fluid flow in the fluid passage by communicating and blocking by the fluid passage; and
a protection member being press-inserted into the housing for protecting the housing from heat of the fluid flow in the fluid passage,
wherein the housing is formed by die casting of an aluminum material,
the protection member and a wall surface, which defines the fluid passage in the housing, define therebetween a thermal insulating layer for restricting thermal transmission of the fluid flow from the protection member toward the housing,
the valve member is a butterfly valve in a substantially disc-shape, and
the butterfly valve is rotatable relative to the housing for blocking and communicating the fluid passage, further comprising:
a seal ring provided to an outer circumferential periphery of the butterfly valve for sealing between the butterfly valve and the protection member,
wherein the outer circumferential periphery of the butterfly valve defines a full close position with respect to the protection member when a gap between the outer circumferential periphery of the butterfly valve and the protection member is minimum,
the protection member has an inner circumferential periphery defining a contact surface in the vicinity of the full close position,
the seal ring has a sliding surface that slides on the contact surface of the protection member when the butterfly valve moves to block the fluid passage,
the housing has a fitting portion to which the protection member is press-inserted,
the protection member has an outer circumferential periphery defining a press-inserted surface via which the protection member is interference-fitted to the fitting portion of the housing, and
the press-inserted surface is distant from the full close position.

5. A fluid control valve comprising;
a housing defining therein a fluid passage;
a valve member for controlling a fluid flow in the fluid passage by communicating and blocking by the fluid passage; and
a protection member being press-inserted into the housing for protecting the housing from heat of the fluid flow in the fluid passage,
wherein the housing is formed by die casting of an aluminum material,
the protection member and a wall surface, which defines the fluid passage in the housing, define therebetween a thermal insulating layer for restricting thermal transmission of the fluid flow from the protection member toward the housing,
the protection member includes an inner cylindrical member accommodating the valve member for blocking and communicating the fluid passage,
the protection member further includes an outer cylindrical member provided to a radially outer side of the inner cylindrical member,
the inner cylindrical member and the outer cylindrical member therebetween define a first thermal insulating layer for restricting thermal transmission of the fluid flow from the inner cylindrical member toward the outer cylindrical member, and
the wall surface, which defines the fluid passage in the housing, and the outer cylindrical member therebetween define a second thermal insulating layer for restricting thermal transmission of the fluid flow from the outer cylindrical member toward the housing.

6. A fluid control valve comprising:
a housing defining therein a fluid passage;
a valve member for controlling a fluid flow in the fluid passage by communicating and blocking by the fluid passage; and
a protection member being press-inserted into the housing for protecting the housing from heat of the fluid flow in the fluid passage,
wherein the housing is formed by die casting of an aluminum material,
the protection member and a wall surface, which defines the fluid passage in the housing, define therebetween a thermal insulating layer for restricting thermal transmission of the fluid flow from the protection member toward the housing, and
the protection member is formed of one of stainless steel and heat-resistive steel.

7. The fluid control valve according to claim 6,
wherein the valve member has an outer circumferential periphery defining a full close position with respect to the housing when a gap between the outer circumferential periphery of the valve member and the housing is minimum, and
the protection member surrounds the wall surface, which defines the fluid passage in the housing, in the vicinity of the full close position.

8. A control valve comprising:
a housing defining therein a fluid passage;
a valve member for controlling a fluid flow in the fluid passage by communicating and blocking by the fluid passage;
a fluid pipe having a first connecting end surface; and
a protection member being press-inserted into the housing for protecting the housing from heat of the fluid flow in the fluid passage,
wherein the housing is formed by die casting of an aluminum material,
the protection member and a wall surface, which defines the fluid passage in the housing, define therebetween a thermal insulating layer for restricting thermal transmission of the fluid flow from the protection member toward the housing,
the housing has a second connecting end surface opposed to the first connecting end surface of the fluid pipe,
the housing has a fitting portion to which the protection member is press-inserted,
the protection member has a flange portion in a substantially annular shape,
the flange portion protrudes from the second connecting end surface of the housing toward the first connecting end surface of the fluid pipe, and
the flange portion is interposed between the first connecting end surface of the fluid pipe and the second connecting end surface of the housing.

9. The fluid control valve according to claim 8, wherein the flange portion is at least partially exposed to an outer circumferential periphery of the fluid pipe and an outer circumferential periphery of the housing.

10. The fluid control valve according to claim 8, wherein the flange portion at least partially protrudes radially outwardly from the outer circumferential periphery of the fluid pipe and the outer circumferential periphery of the housing.

11. A fluid control valve comprising:
a housing defining therein a fluid passage;
a valve member for controlling a fluid flow in the fluid passage by communicating and blocking by the fluid passage; and
a protection member being press-inserted into the housing for protecting the housing from heat of the fluid flow in the fluid passage,
wherein the housing is formed by die casting of an aluminum material,
the protection member and a wall surface, which defines the fluid passage in the housing, define therebetween a thermal insulating layer for restricting thermal transmission of the fluid flow from the protection member toward the housing,
the protection member includes an inner cylindrical member accommodating the valve member for blocking and communicating the fluid passage,
the protection member further includes an outer cylindrical member provided to a radially outer side of the inner cylindrical member,
the housing has a fitting portion to which the outer cylindrical member is press-inserted, and
the outer cylindrical member is interference-fitted to the fitting portion of the housing.

12. The fluid control valve according to claim 11,
wherein the outer cylindrical member has a fitting portion to which the inner cylindrical member is press-inserted, and
the inner cylindrical member is interference-fitted to the fitting portion of the outer cylindrical member.

13. A fluid control valve comprising:
a housing defining therein a fluid passage;
a valve member for controlling a fluid flow in the fluid passage by communicating and blocking by the fluid passage; and
a protection member being press-inserted into the housing for protecting the housing from heat of the fluid flow in the fluid passage,
wherein the housing is formed by die casting of an aluminum material,
the protection member and a wall surface, which defines the fluid passage in the housing, define therebetween a thermal insulating layer for restricting thermal transmission of the fluid flow from the protection member toward the housing,
the valve member has an outer circumferential periphery defining a full close position with respect to the housing when a gap between the outer circumferential periphery of the valve member and the housing is minimum,
the protection member includes a first protection member that surrounds the wall surface, which defines the fluid passage in the housing, in the vicinity of the full close position, and
the protection member further includes a second protection member that surrounds the wall surface, which defines the fluid passage in the housing, downstream of the full close position with respect to the fluid flow.

14. The fluid control valve according to claim 13, wherein the first protection member and the second protection member are formed of one of stainless steel and heat-resistive steel.

* * * * *